US009491580B1

(12) United States Patent
Hagon et al.

(10) Patent No.: US 9,491,580 B1
(45) Date of Patent: Nov. 8, 2016

(54) SYSTEMS AND METHODS FOR ELECTRONICALLY VERIFYING USER LOCATION

(71) Applicant: IMG GLOBALSECUR, INC., Leesburg, FL (US)

(72) Inventors: Christopher A. Hagon, Leesburg, FL (US); Timothy Bradley, Pembroke Pines, FL (US)

(73) Assignee: IMG GLOBALSECUR, INC., Leesburg, FL (US)

( * ) Notice: Subject to any disclaimer, the term of this patent is extended or adjusted under 35 U.S.C. 154(b) by 0 days.

(21) Appl. No.: 14/794,753

(22) Filed: Jul. 8, 2015

Related U.S. Application Data

(60) Provisional application No. 62/021,799, filed on Jul. 8, 2014.

(51) Int. Cl.
| | |
|---|---|
| *H04W 4/02* | (2009.01) |
| *G06Q 50/14* | (2012.01) |
| *H04W 8/18* | (2009.01) |
| *H04W 4/22* | (2009.01) |

(52) U.S. Cl.
CPC ............ *H04W 4/023* (2013.01); *G06Q 50/14* (2013.01); *H04W 4/22* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 2008/0018458 A1* | 1/2008 | Derrick | G07C 9/00111 340/539.13 |
| 2012/0069131 A1* | 3/2012 | Abelow | G06Q 10/067 348/14.01 |
| 2015/0295808 A1* | 10/2015 | O'Malley | H04L 47/22 709/224 |

* cited by examiner

*Primary Examiner* — Diane Mizrahi
(74) *Attorney, Agent, or Firm* — Allen Dyer Doppelt Milbrath & Gilchrist

(57) ABSTRACT

Computer-based systems and methods for verifying user location utilize at least one processor and memory configured with program instructions to store a plurality of user profiles associated with a plurality of users, each user profile including contact information for a mobile device, and to determine an applicable tracking policy for each of the plurality of users based upon at least one set of tracking rules, the applicable tracking policy including a reporting schedule. Receipt of location reports for the plurality of users from the plurality of mobile devices are monitored, and a status is periodically determined for each of the plurality of users based on the reporting frequency and timing of the receipt of location reports relative to the reporting schedule. Location can thereby be verified without the need to actively track user location.

20 Claims, 11 Drawing Sheets

| ORGANIZATION 104 | NAME 204 | CITIZENSHIP 206 | PRIMARY PHONE 208 | EMERGENCY CONTACT NAME 210 | OTHER 212 |
|---|---|---|---|---|---|
| ACME | Jack B. | USA | 650-155-2415 | Susan B. | X,Y |
| ACME | Joanne C. | Canada | 501-312-6141 | Philip M. | Z,M |
| Lawson | Phil M. | Egypt | 613-241-4464 | John C. | D,F |
| ••• | ••• | ••• | ••• | ••• | ••• |

TABLE VIEW 250

FIGURE 2

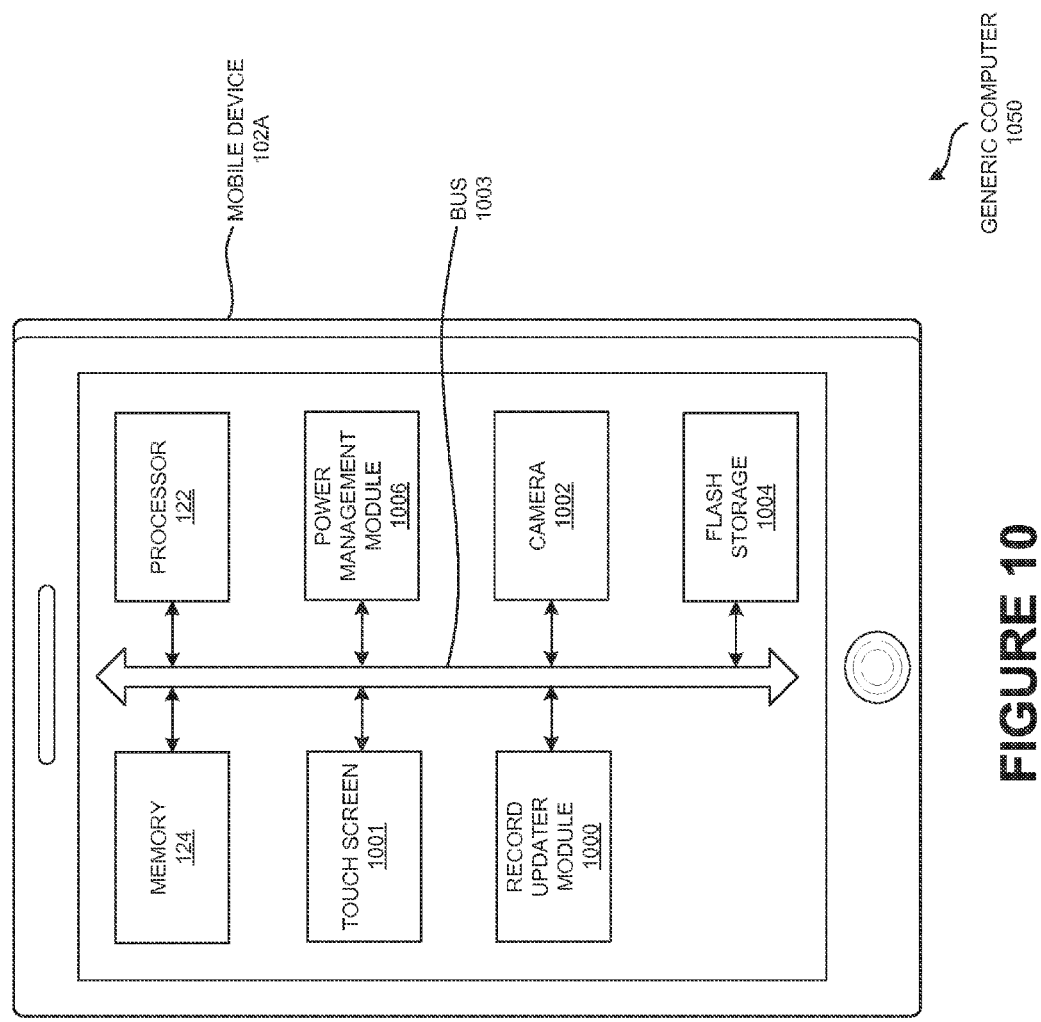

| COMPANY | LAST NAME | FIRST NAME | LAST LOCATION | DATE | TIME | LOCATION HISTORY | CHECK-IN | CHECK-IN | CHECK-IN | STATUS |
|---|---|---|---|---|---|---|---|---|---|---|
| ABC COMPANY | BRADLEY | TIM | 26.028331756591 8, -80.346092224121 1 | 5/27/2014 | 11:04:58 ET | | | | | ● |
| | | | | | | | | | | ○ |
| | | | | | | | | | | ● |

TABLE VIEW
1150

GREEN STATUS = TRAVELER HAS CHECKED IN WITHIN 1 HOUR OF THE MOST RECENT CHECK-IN RULE, OR THERE ARE NO CHECK-IN RULES SET.

YELLOW STATUS = TRAVELER IS 30 MINUTES LATE FOR CHECK-IN FOR MOST RECENTLY PASSED CHECK-IN RULE. TEXT MESSAGE SENT TO TRAVELER REMINDING THEM TO CHECK-IN.

RED STATUS = TRAVELER IS 60 MINUTES LATE FOR CHECK-IN. TEXT MESSAGE SENT TO TRAVELER AND COMPANY POC. TEXT MESSAGE SENT EVERY HOUR TO BOTH. WHEN TRAVELER IS LATE FOR NEXT CHECK, TEXT MESSAGE SENT TO GLOBAL ADMIN AS WELL.

FIGURE 11

SYSTEMS AND METHODS FOR ELECTRONICALLY VERIFYING USER LOCATION

CROSS-REFERENCE TO RELATED APPLICATION

This application claims the benefit of U.S. Provisional Patent Application Ser. No. 62/021,799, filed on Jul. 8, 2014, the contents of which are herein incorporated by reference in their entirety.

FIELD OF THE INVENTION

The present invention relates to the electronic determination of the location of mobile device users, and more particularly, to systems and methods for verifying user location during travel abroad.

BACKGROUND OF THE INVENTION

There are often special safety considerations associated with travel, including those associated with a traveler becoming lost, either accidentally or as a result of criminal activity like kidnapping. For the security and peace of mind of the traveler, as well as a related organization (such as a family of the traveler, or business or government agency employing the traveler), it can be desirable to track the traveler's position during travel.

While technology to do this is readily available (e.g., by automatically receiving position reports from a mobile device carried by the traveler) it suffers from various shortcomings. For instance, where an organization may have a large number of travelers abroad at any given time, coordination and organization of the information may be insufficient to allow it to be usefully processed in a timely manner by the organization. Perhaps more fundamentally, there is often a conflict between a desire for privacy on the part of individual travelers, and a desire for information on the part the related organization. A traveler might therefore disable or leave behind his or her mobile device in the interests of privacy, despite the greater associated risk. Accordingly, there is a need for systems and methods to satisfactorily verify the location of traveling users without the need for automatic tracking of the users.

SUMMARY OF THE INVENTION

In view of the foregoing, it is an object of the present invention to provide improved systems and methods for electronically verifying user location. According to embodiments of the present invention, computer-based systems and methods for verifying user location utilize at least one processor and memory configured with program instructions to store a plurality of user profiles associated with a plurality of users, each user profile including contact information for a mobile device, and to determine an applicable tracking policy for each of the plurality of users based upon at least one set of tracking rules, the applicable tracking policy including a reporting schedule. Receipt of location reports for the plurality of users from the plurality of mobile devices are monitored, and a status is periodically determined for each of the plurality of users based on the reporting frequency and timing of the receipt of location reports relative to the reporting schedule.

According to one aspect of the present invention, the at least one set of tracking rules includes different reporting schedules for different countries, the processor and memory being further configured to determine the applicable tracking policy based on determining a country in which each of the plurality of users is located. The processor and memory can be further configured to store a plurality of travel itineraries associated with the plurality of users, and to determine the country in which each of the plurality of users is located based on the plurality of travel itineraries. Additionally or alternately, the country in which each of the plurality of users is located can be determined based on the receipt of location reports.

According to another aspect of the present invention, each user profile further includes a user organization, the processor and memory are further configured to store a plurality of sets of tracking rules associated with different user organizations and to also determine the applicable tracking policy based on the user organization.

According to a further aspect of the present invention, the periodic determination of the status for each of the plurality of users by the processor and memory includes determining whether a most recent location report is on time or late. If a most recent location report is determined to be late, the processor and memory can be further configured to automatically contact the mobile device to prompt the submission of another location report. Determining whether the most recent report is late can further include determining whether the most recent report is late by a first time period or a second time period longer than the first time period, and the processor and memory are further configured to automatically notify a third party contact in addition to automatically contacting the mobile device. If each user profile further includes a user organization, the processor and memory can be further configured to select the third party contact associated with the user organization.

According to an additional aspect of the present invention, the processor and memory are further configured to receive location-specific travel alerts and to automatically forward the location-specific travel alerts to the plurality of mobile devices based on user locations.

According to a further aspect of the present invention, the processor and memory are also configured to monitor receipt of user panic notifications from the plurality of mobile devices, and to automatically notify a third party contact upon receipt. The third party contact can be associated with a medical response organization. The notification sent to the third party contact can include a user location, which can be determined from the user panic notification.

According to another aspect, where the processor and memory are further configured to store a plurality of travel itineraries associated with the plurality of users, the periodic determination of the status for each of the plurality of users by the processor and memory includes determining whether the location reports are consistent with the travel itineraries.

In an additional aspect, the processor and memory are further configured to generate a status interface displaying the determined statuses for the plurality of users. Where each user profile further includes a user organization, the processor and memory are further configured to generate organization interfaces, each showing only users associated with a particular user organization. A customized set of travel rules for the particular user organization can be generated by the processor and memory via its organization interface. User profile information for users associated with a particular user organization can also be accepted via its organization interface.

These and other objects, aspects and advantages of the present invention will be better appreciated in view of the drawings and following detailed description of preferred embodiments.

BRIEF DESCRIPTION OF THE DRAWINGS

FIG. 2 is a table view of a profile of a user of the system of FIG. 1;

FIG. 10 is an internal hardware view of a generic computer used to access a network of groups surrounding a geo-spatial location in connection with the system of FIG. 1; and FIG. 11 is a table view of a user interface generated by the system of FIG. 1 to display various user statuses.

DETAILED DESCRIPTION OF PREFERRED EMBODIMENTS

Figure 1:
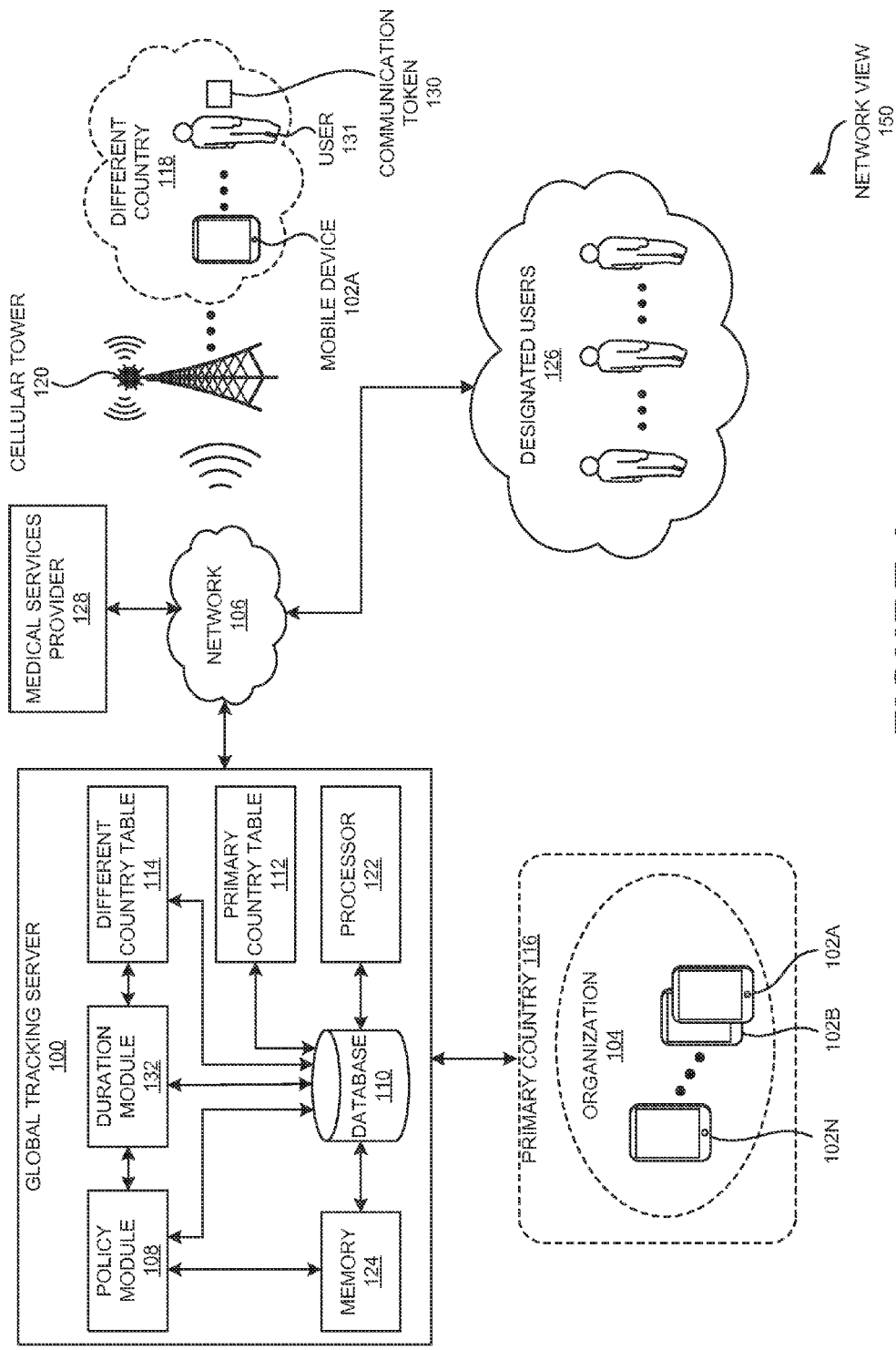
FIG. 1 is a schematic overview of a system for electronically verifying user location, according to an embodiment of the present invention.

Systems and methods for electronically verifying user location are disclosed. FIG. 1 is a network view 150 of a global tracking server 100 communicating with a user 131 who uses a mobile device 102A of an organization 104, according to one embodiment. Particularly, FIG. 1 illustrates a global tracking server 100 communicatively coupled with a mobile device 102A through a network 106. An organization 105 is illustrated as included any number of the mobile devices 102A-N. The global tracking server 100 includes a policy module 108, a database 110, a primary country table 112, a different country table 114, a processor 122, a memory 124, and a duration module 132. A medical services provider 128 is communicatively coupled with the global tracking server 100 and the mobile device 102A through the network 106. Also illustrated in FIG. 1 is a primary country 116, and a different country 118. The primary country 116 is associated with the organization 104 having the mobile device 102A-N in FIG. 1. The different country is associated with a user 131 that uses the mobile device 102A and the communication token 130.

Figure 5:
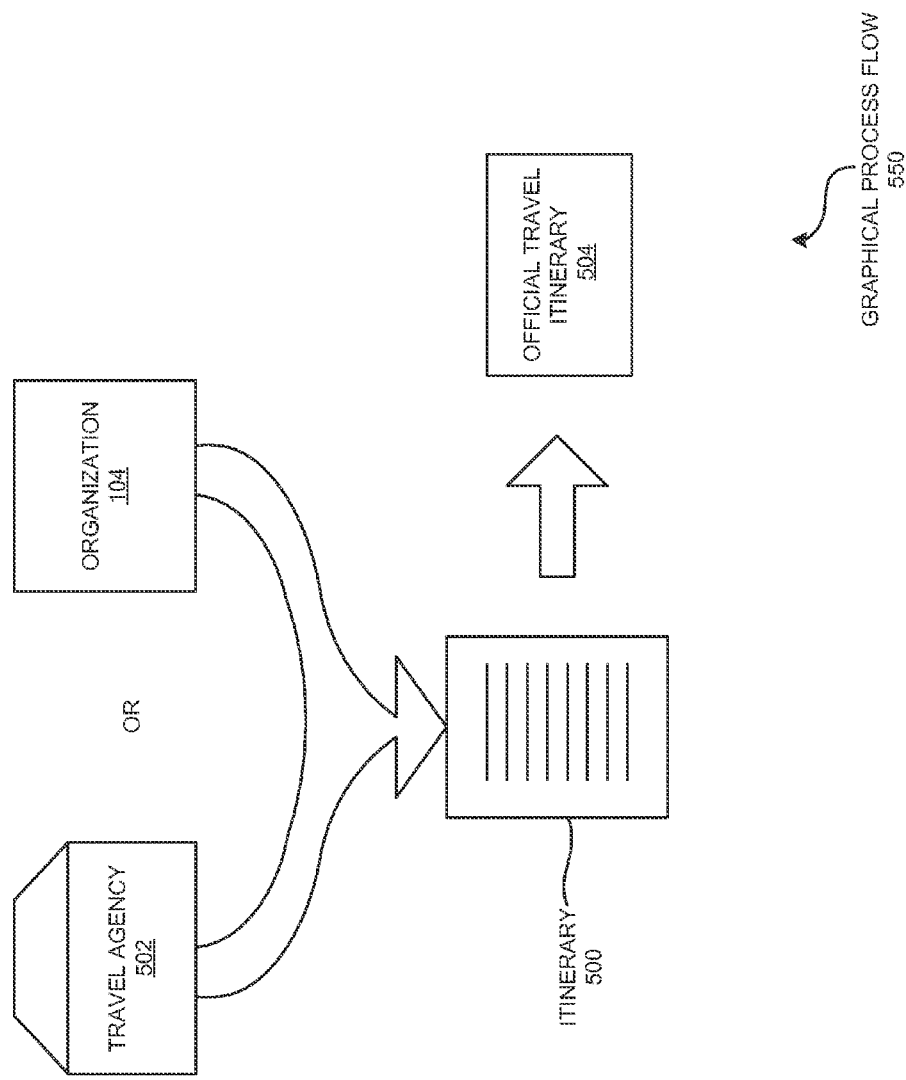
FIG. 5 is a graphical process flow a travel itinerary being processed by the system of FIG. 1.

For example, the global tracking server 100 may be activated when an employee 'Bob Jones' of a corporation Acme Geochemicals may travel from his home in Baltimore Md. to Mombasa Kenya. The global tracking server 100 may receive an itinerary 500 (e.g., see FIG. 5) of Bob Jones a number of ways. For example, a travel agent 502 as illustrated in FIG. 5 (e.g., American Express Travel, Carlson Travel, etc.) may provide an itinerary of Bob's trip to the global tracking server 100 of FIG. 1. Alternatively, the organization (e.g., Acme Geochemicals) may provide the itinerary 500 of Bob Jones to the global tracking server 100 by including it in the database 110. Bob may 'check in' during his travels in Kenya by opening a client side application 906 (e.g., see FIG. 9) on his mobile phone. When Bob checks in (e.g., he may click the 'Report Location' button illustrated in FIG. 9 as the self-proclaimed representation 602), geospatial data and other information (e.g., weather, health, time, day, etc.) may be transmitted to the global tracking server 100. In an alternate embodiment, Bob's whereabouts during international travel may be automatically tracked based on preset policies, contracts, and/or other agreements between the global tracking server 100 and the organization 104 and/or Bob (e.g., the user 131).

Figure 7:
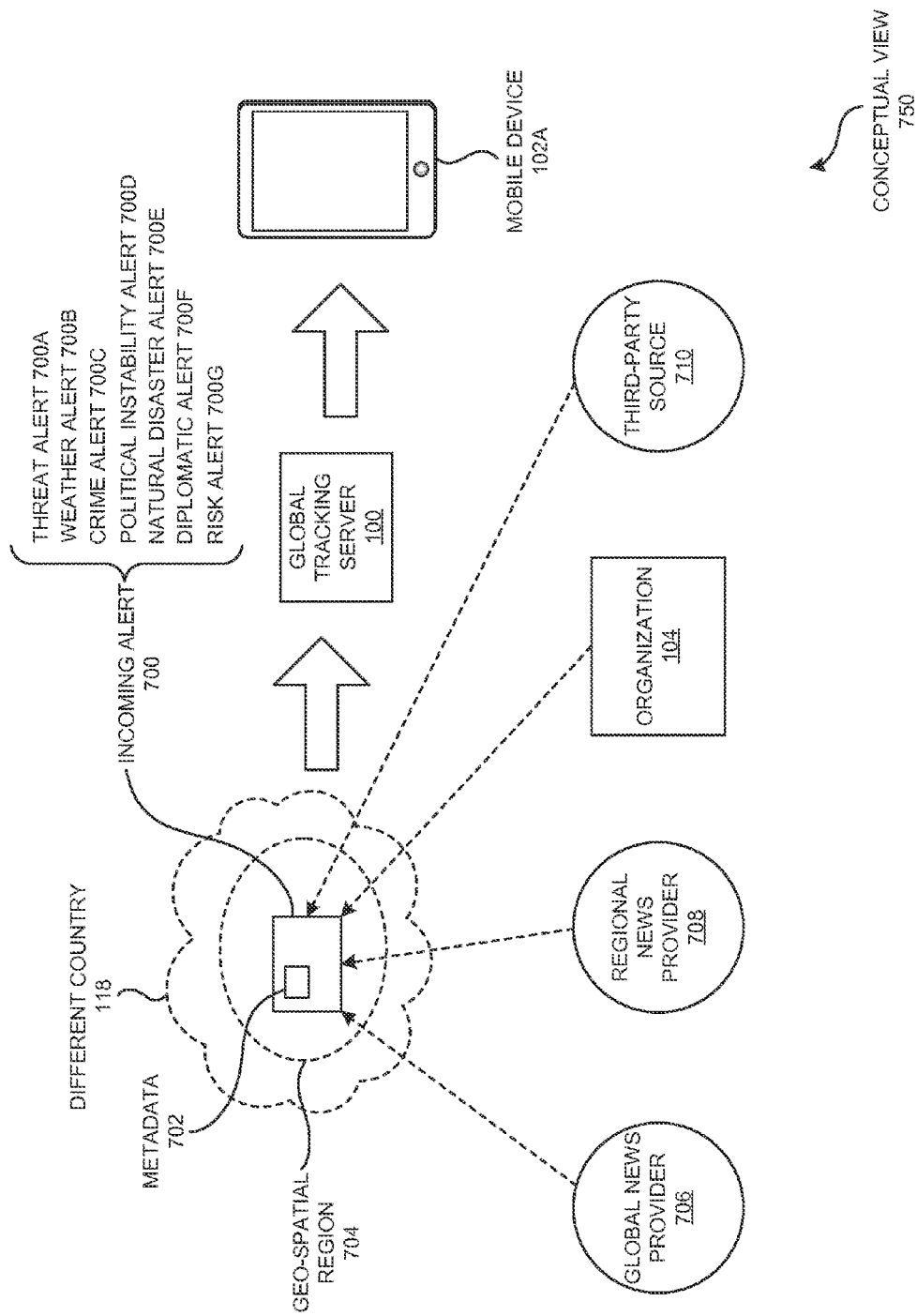
FIG. 7 is conceptual view of an incoming alert being distributed by the system of FIG. 1.

Bob may receive travel alerts (e.g., threat alert 700A, a weather alert 700B, a crime alert 700C, a political instability alert 700D, a natural disaster alert 700E, a diplomatic alert 700F, and/or a risk alert 700G as shown in FIG. 7) during his travels abroad from the global tracking server 100 directly to his mobile device 102A based on his current geo-spatial location within Kenya. Further, the global tracking server 100 may predict where Bob is to be at during a specific time of day and/or location and periodically verify that Bob has arrived to the location he was scheduled to be at. Through this, Bob's safety when traveling to remote and/or unsafe areas of a country and/or part of the world can be further protected. In addition, liability for the organization 104 can be minimized. Further, in the case Bob travels outside of a designated region, a virtual fence 902 may automatically trigger a boundary alert 900.

The mobile device 102A may be issued by the organization 104 to the user 131 when the user 131 travels to a different country 118. The international travel itinerary may be a trip across two or more countries, and/or domestic travel within a country different than a primary country 116. In one embodiment, a method of a global tracking server 100 includes: (1) registering an organization 104 on the global tracking server 100 using a processor 122 and a memory 124; (2) associating a mobile device 102A with the organization 104; (3) creating a profile of a user 131 of the mobile device 102A associated with the organization 104; and (4) generating and processing a series of alert messages to/from the mobile device 102A when the mobile device 102A is in a different country 118 from a primary country 116 and when the user 131 of the mobile device 102A is on an international travel assignment sponsored by the organization 104.

The profile of the user 131 may be associated with a name 200, a citizenship 202, a primary phone 204, an emergency contact name 206, an address 300, a city 302, a state/province 304, a postal code 306, an emergency contact phone number 308, and an electronic communications address 310.

The method may determine that the user 131 is in the different country 118 based on a set of geo-spatial coordinates captured through the mobile device 102A and/or a cellular tower 120 closest to the mobile device 102A. The user 131 may be validated as being on an official travel of the organization 104 based on an itinerary 500 of the user 131 provided by the organization 104 and/or a travel agency 502 through the global tracking server 100, a database lookup, a self-proclaimed representation 602 of the user 131 through the mobile device 102A, and/or an automatic tracking of the mobile device 102A. The method may determine that a panic alert 600 has been generated using the mobile device 102A.

FIG. 2 is a table view 250 of a profile of the user 131, according to one embodiment. In FIG. 2, records are shown in a table view 250 including an organization 104 field, a name field 200, a citizenship filed 202, a primary phone 204, an emergency contact filed 206, and other fields 208. The table view 250 may be stored in the database 110 of FIG. 1 in one embodiment. It will be understood to one with skill in the art that the table view 250 of FIG. 2 is illustrative only, and not intended to be restrictive.

Figure 3:
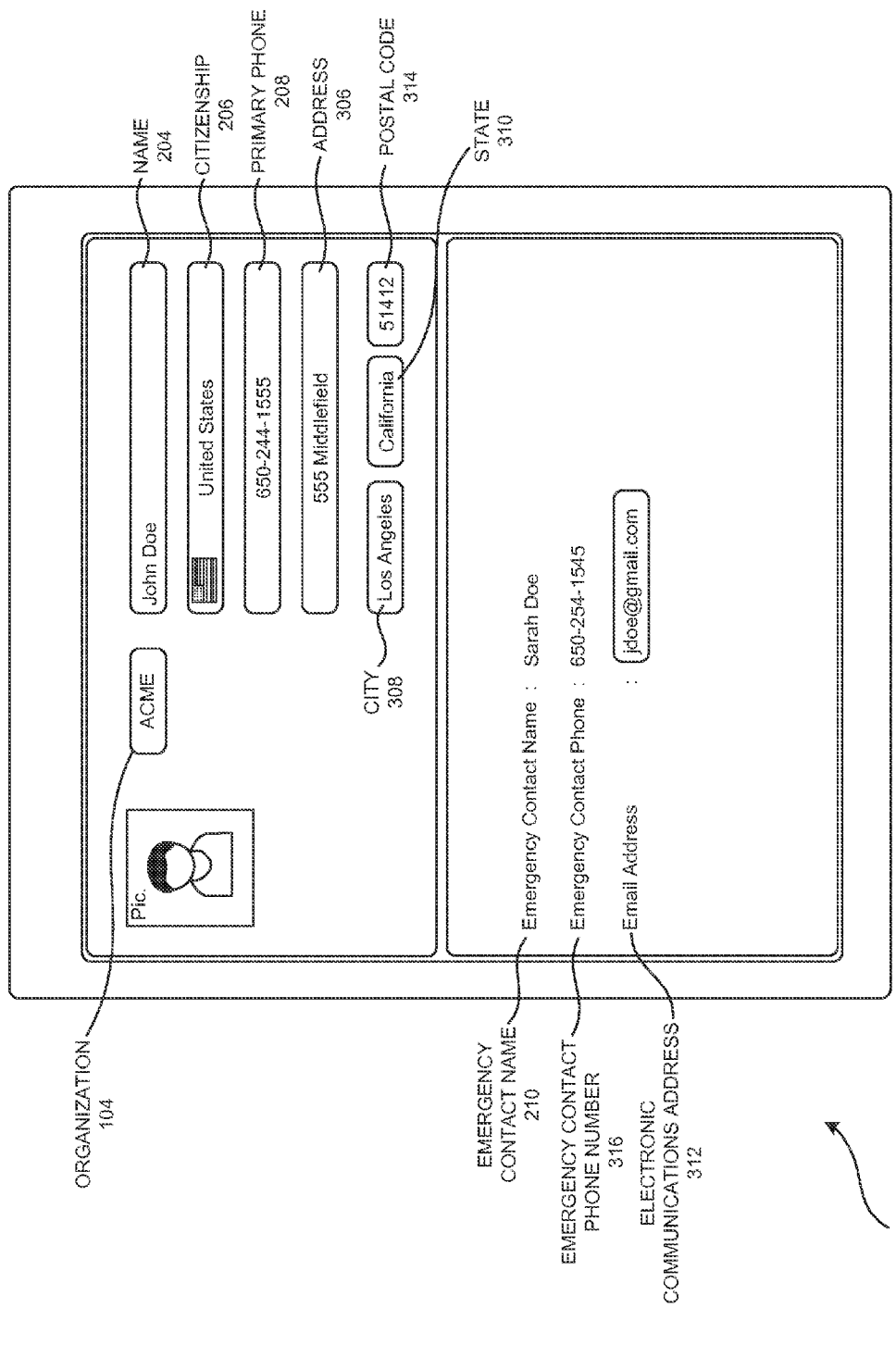
FIG. 3 is a user interface view for generating and editing the user profile of FIG. 2.

FIG. 3 is a user interface view 350 of the profile of the user 131, according to one embodiment. Particularly, FIG. 3 illustrates a profile of a user 'John Doe' who works for the organization 104 named 'Acme'. John may be an employee of the organization 104 of Acme, and may be on an international travel assignment outside of his primary country 116.

Figure 4:
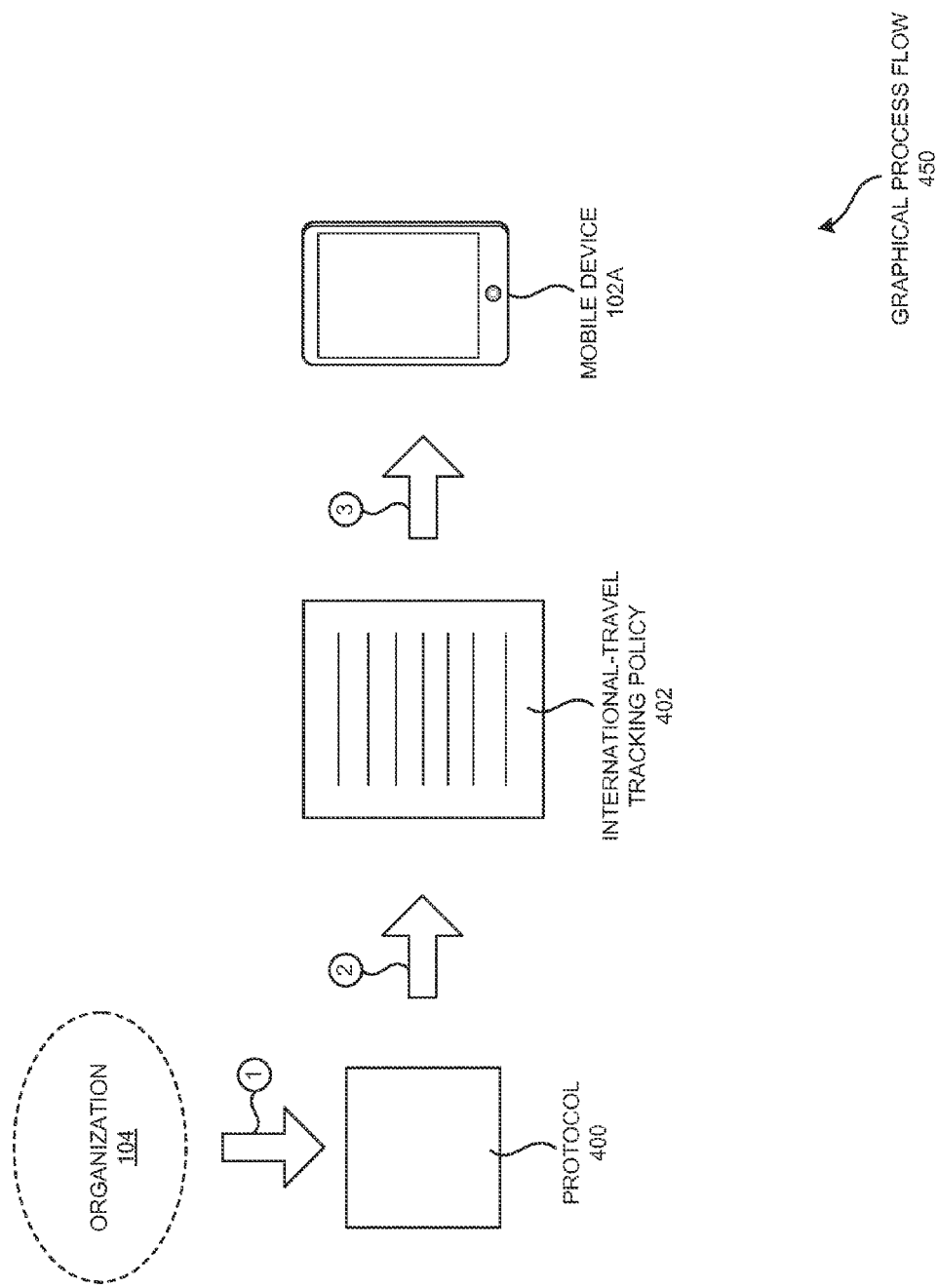
FIG. 4 is a graphical process flow of a protocol of an organization being used to determine an applicable tracking policy by the system of FIG. 1.

FIG. 4 is a graphical process flow 450 of a protocol 400 of an organization 104 being applied to an international-time tracking policy 402 to determine how the global tracking server 100 of FIG. 1 should track (e.g., which business and policy rules should be applied) to the mobile device 102A, according to one embodiment.

An international-travel tracking policy 402 may be determined based on a primary country 116 of the organization 104 and/or the user 131 of the mobile device 102A. The international-travel tracking policy 402 may be determined based on the protocol 400 specified by the organization 104 that defines a set of rules associated with a different country 118 than the primary country 116.

FIG. 5 is a graphical process flow 550 of an itinerary 500 being confirmed as an official travel itinerary 504 in the global tracking server 100 of FIG. 1 based on information from a travel agency 502 and/or the organization 104, according to one embodiment. Particularly, FIG. 5 illustrates how the global tracking server 100 determines whether the user 131 is to be tracked or not through his or her mobile device 102A based on whether the user 131 is on an official business trip. In one embodiment, the user 131 may not be tracked when on vacation and/or recreational travel, and may only be tracked during official business trips. A itinerary 500 associated with the user 131 of the mobile device 102A may be configured based on the international-travel tracking policy 402 determined set through the protocol 400 specified by the organization 104 that defines the set of rules associated with the different country 118.

Figure 6:
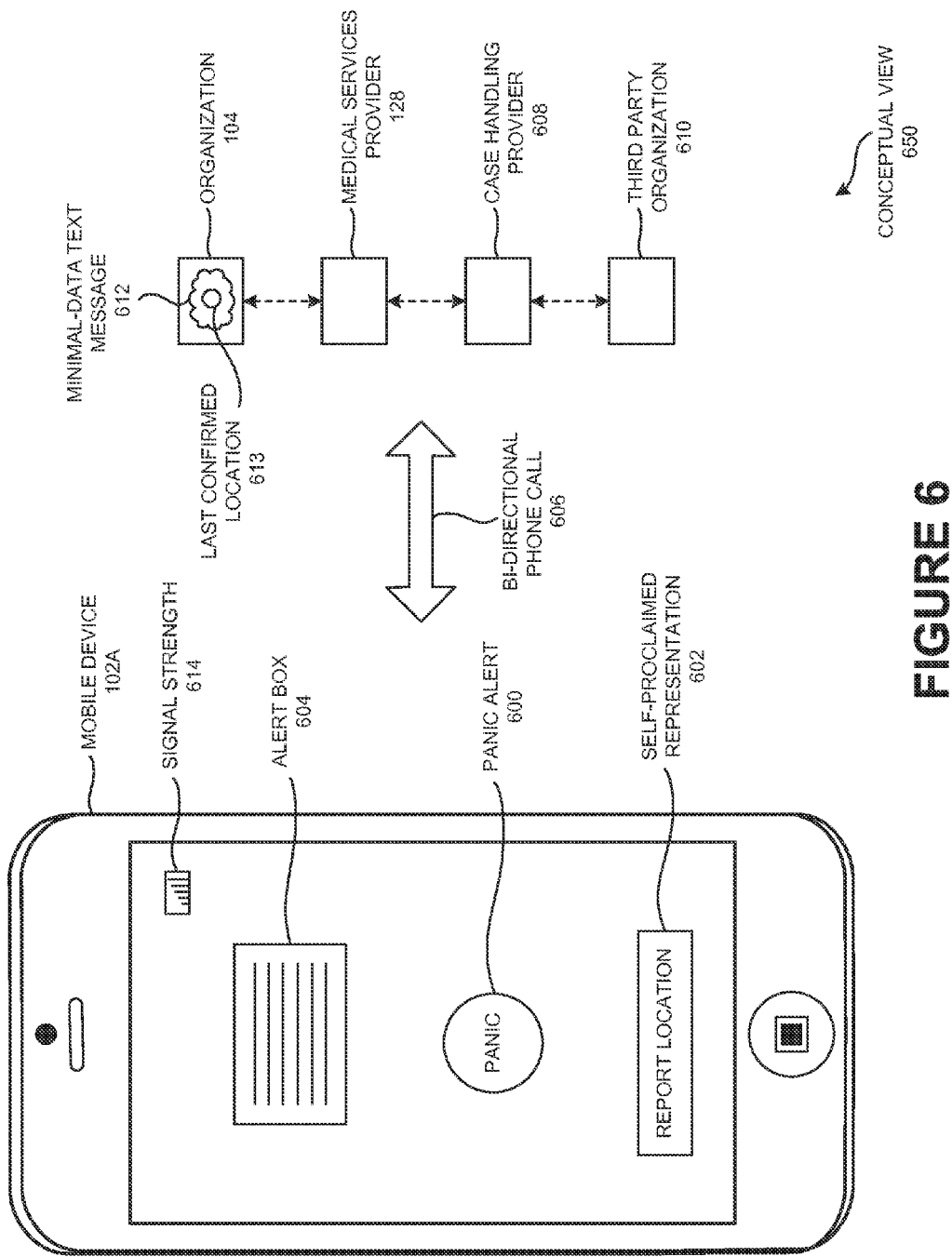
FIG. 6 is a conceptual view of a mobile device associated with the system of FIG. 1 bi-directionally communicating with various parties after a panic alert is triggered.

FIG. 6 is a conceptual view 650 of the mobile device 102A bi-directionally communicating with various parties after a panic alert 600 is triggered, according to one embodiment. Particularly, FIG. 6 illustrates a process through which the panic alert 600 is transmitted from the mobile device 102A to the global tracking server 100. Once received, the panic alert 600 may be communicated from the global tracking server 100 to a set of users designated by the organization 104 (e.g., designated users 126) Responsive to the panic alert 600, a medical services provider 128 may be notified. A response to the panic alert 600 may be displayed on the alert box 604 in one embodiment.

In addition, responsive to the panic alert 600, a bi-directional phone call 606 may be generated between the user 131 of the mobile device 102A and the organization 104, the medical services provider 128, a case handling provider 608, and/or a third party organization 610. A minimal-data text message 612 may be received at the global tracking server 100 when a signal strength 614 associated with the set of geo-spatial coordinates captured through the mobile device 102A and/or the cellular tower 120 closest to the mobile device 102A is below a threshold strength and the panic alert 600 is generated using the mobile device 102A. A confirmation may be presented on the mobile device 102A when the minimal-data text message 612 is confirmed as received at the global tracking server 100. A last confirmed location 613 of the mobile device 102A may be delivered to the global tracking server 100 along with the minimal-data text message 612.

A satellite message may be received at the global tracking server 100 from a communication token external to the mobile device 102A to communicatively pair with the mobile device 102A when the signal strength 614 associated with the set of geo-spatial coordinates captured through the mobile device 102A and/or the cellular tower 120 closest to the mobile device 102A is below a threshold strength and the panic alert 600 is generated using the mobile device 102A. The communication token may be carried in a person of the user 131 and/or in a travel item carried by the user 131.

FIG. 7 is conceptual view 750 of an incoming alert 700 being distributed to the mobile device 102 through the global tracking server 100, according to one embodiment. Particularly, an incoming alert 700 associated with at least a geo-spatial region in the different country 118 may be validated through the global tracking server 100. The method may determine duration of the incoming alert 700 based on a metadata 702 associated with the incoming alert 700. The method may communicate the incoming alert 700 from the global tracking server 100 to the mobile device 102A if the mobile device 102A is in at least the geo-spatial region 704 in the different country 118. The incoming alert 700 may be received from a global news provider 706, a regional news provider 708, the organization 104, and/or a third-party source 710. The incoming alert 700 may be a threat alert 700A, a weather alert 700B, a crime alert 700C, a political instability alert 700D, a natural disaster alert 700E, a diplomatic alert 700F, and/or a risk alert 700G.

Figure 8:
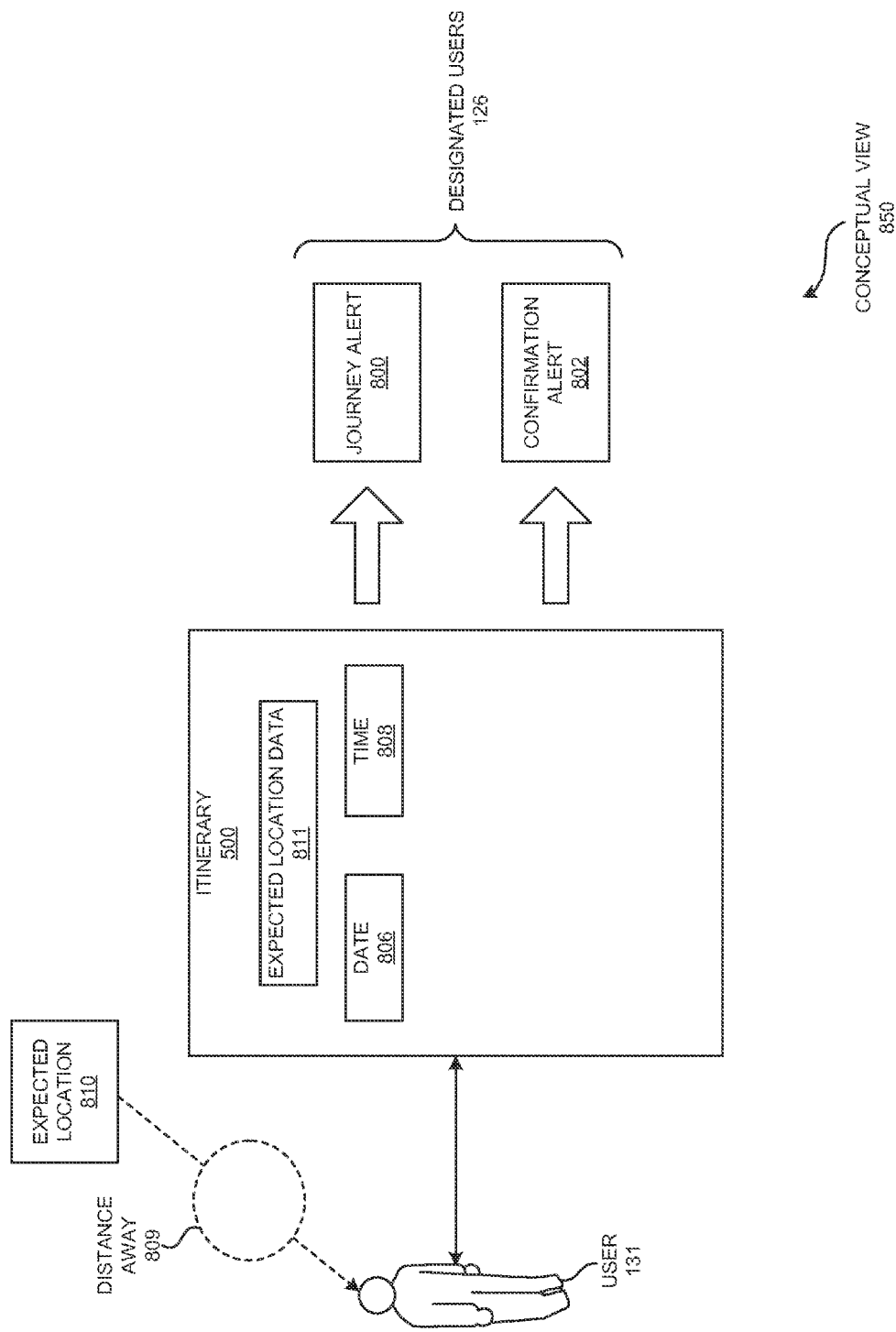
FIG. 8 is a conceptual view of a journey alert being distributed to designated users by the system of FIG. 1.

FIG. 8 is a conceptual view 850 of a journey alert 800 being distributed to designated users 126, according to one embodiment. The itinerary 500 may automatically trigger a journey alert 800 to the set of users designated by the organization 104 (e.g., designated users 126) when the user 131 of the mobile device 102A is determined to be a distance away 809 from an expected location 810 in the itinerary 500 based on a date 806 and/or a time 808 defined in the itinerary 500. The expected location 810 may be represented as an expected location data 811 next to a date 806 and a time 808 on the itinerary 500 as illustrated in FIG. 8. The itinerary 500 may automatically trigger a confirmation alert 802 to the set of users designated by the organization 104 (e.g., designated users 126) when the user 131 of the mobile device 102A is determined to at the expected location in the itinerary 500 based on the date 806 and/or the time 808 defined in the itinerary 500.

Figure 9:
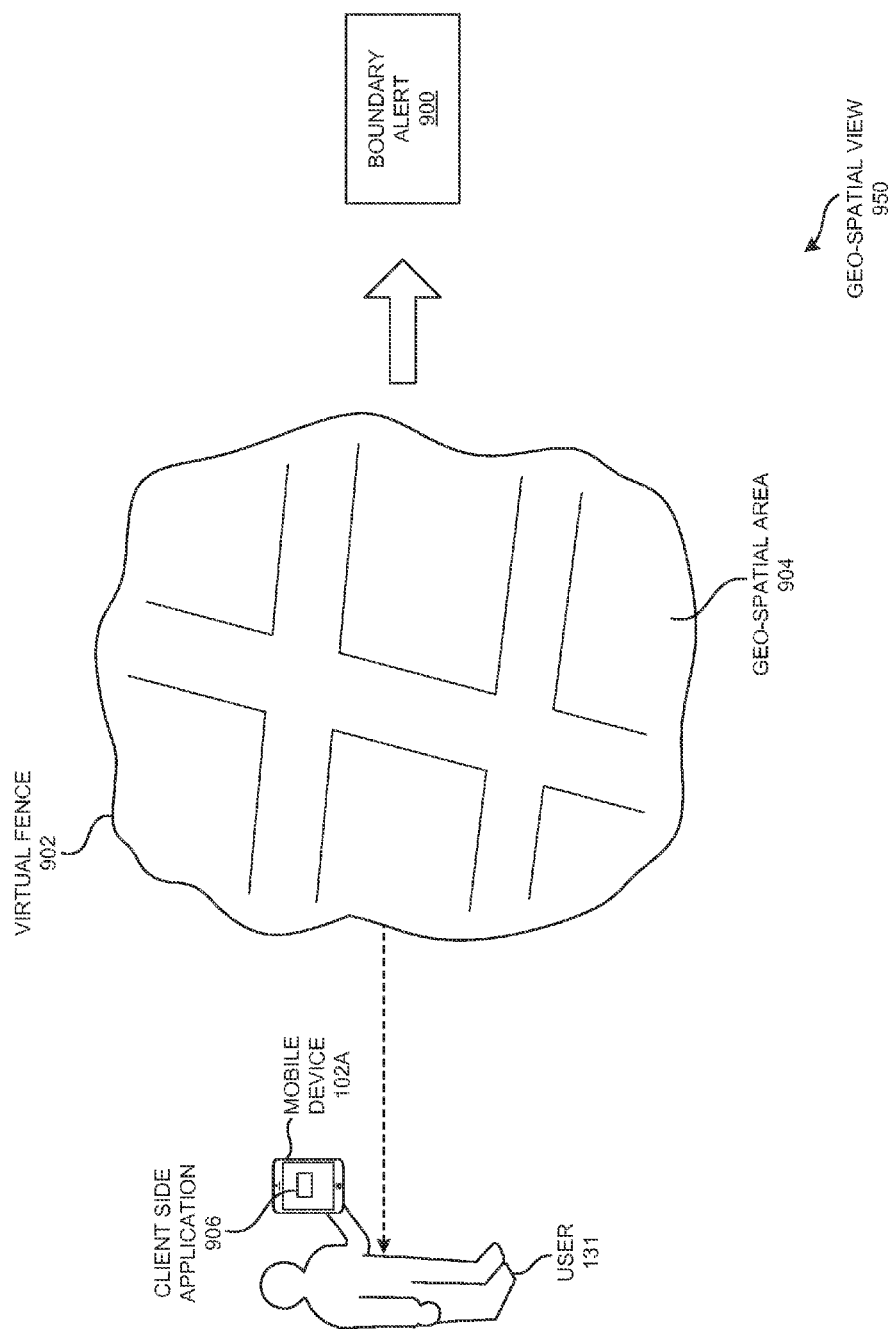
FIG. 9 is a geospatial view of a virtual fence generated by the system of FIG. 1, in which a boundary alert is triggered when the user leaves the geospatial area covered by the virtual fence.

FIG. 9 is a geospatial view 950 of a virtual fence 902 in which a boundary alert 900 is triggered when the user 131 leaves the geospatial area 904 covered by the virtual fence 902, according to one embodiment. The method may configure a virtual fence 902 associated with the user 131 of the mobile device 102A based on the international-travel tracking policy 402 determined set through the protocol 400 specified by the organization 104 that defines the set of rules associated with the different country 118. The virtual fence 902 may automatically trigger a boundary alert 900 to the set of users designated by the organization 104 (e.g., designated users 126) when the user 131 of the mobile device 102A is determined to be outside of a polygon defining a geo-spatial area 904 in which the user 131 is permitted to travel through the virtual fence 902 based on the date 806 and the time 808 defined in the virtual fence 902. The user 131 of the mobile device 102A may provide permission to the global tracking server 100 to periodically determine the location of the mobile device 102A when a client-side application 906 of the mobile device 102A is instantiated by the user 131.

FIG. 10 is an internal hardware view of a generic computer used to access a network of groups surrounding a geo-spatial location, according to one embodiment. Particularly, FIG. 10 illustrates a generic computer 1050, according to one embodiment. The embodiment of FIG. 10 describes a global tracking server 100, a processor 122, a memory 124, a touch screen 1004, a power management module 1006, a bus 1008, a camera 1010, and a flash storage 1012.

The processor 122 may be any hardware that performs the instructions of a computer program by carrying out the basic arithmetical, logical, and input/output operations of the generic computer 1050. There may be one or more processor 122 working in concert to perform a common task. The processor 122 may be any microprocessor, multiprocessor, integrated circuit, and/or multi-core processor, and may comprise an arithmetic logic unit (ALU) and/or a control unit (CU). The processor 122 and the global tracking server 100 may be communicatively coupled to the bus 1008 of the generic computer 1050.

The memory 124 may be any physical device that stores computer programs and/or data on a temporary and/or permanent basis. The memory 124 may be primary memory (e.g., RAM), secondary memory (e.g., physical devices for program and data storage), and/or cache memory, and may be manufactured from semiconductor material. The memory 124 may also be a volatile memory and/or non-volatile memory, and may comprise of one or more physical devices. The memory 124 may be communicatively coupled to the bus 1008 of the generic computer 1050.

The touch screen 1004 may be any electronic visual device that a user can control through simple or multi-touch gestures by touching the screen with a stylus, a pen, a single finger, or multiple fingers. The screen may be a surface of an electronic device on which images and data are displayed (e.g., CRT, LCD, plasma screens, etc.). The touch screen 1004 may be communicatively coupled to the bus 1008 of the generic computer 1050.

The power management module 1006 may be any electronic controller that governs power functions of electronic devices. The power management module 1006 may comprise an analog to digital converter to measure the voltages of the main battery or power source of the generic computer 1050. The power management module 1006 may be communicatively coupled to the bus 1008 of the generic computer 1050.

The camera 1010 may be an optical instrument that records images that can be stored directly and/or transmitted to another location. The images may be still photographs or moving images such as videos and/or movies. The camera 1010 may be communicatively coupled to the bus 1008 of the generic computer 1050.

The flash storage 1012 may be an electronic non-volatile computer storage medium that may be erased and/or reprogrammed (e.g., USB flash drives, memory cards, solid-state drives, etc.). The flash storage 1012 may be of the NAND and/or NOR logic gates type. The flash storage 1012 may be communicatively coupled to the bus 1008 of the generic computer 1050. [0028] The bus 1008 may be a communication system that transfers data between components inside the generic computer 1050 and may also allow for the transfer of data between another or multiple computers (e.g. USB, FireWire, SATA, etc.). The bus 1008 may be an internal bus that connects all the internal components of a computer, such as CPU and memory, to the motherboard. It may also be an external bus that is made up of the electronic pathways that connect the different external devices, such as a printer, scanner, and etc.

FIG. 11 is a table view 1150 illustrating various status alerts, according to one embodiment. Particularly, FIG. 11 shows three status types, a green status, a yellow status and a red status. The green status indicates that the traveler (e.g., the user 131) has checked in within an hour of the check-in rule and is therefore in conformance with the itinerary 500. The yellow status indicates that the traveler is late by 30 minutes for the most recent check-in. The red status indicates the user is 60 minutes late for check-in.

This information can be included in an administrator panel of the global tracking server 100 and/or the client side application 906. The panel allows administrators to set individual rules for client side application 906 users. Further example statuses include:

Green Status=Traveler checked in within 1 hour of the most recent Check-In rule, or there are no Check-In rules set.

Yellow Status=Traveler may be 30 minutes late for check-in for most recently passed Check-In rule. Text message sent to Traveler reminding them to check in.

Red Status=Traveler may be 60 minutes late for check-in. Text Message sent to Traveler and Company POC. Text Message sent every hour to both. When traveler may be late for next check, text message sent to Global Admin as well.

Additional enhancements to the various embodiments described herein with respect to the global tracking server 100 can include:

Ability to clear or reset Check-In rules.

Ability to set number to contact via SMS for failed check in.

Location History that when selected displays a List view of the traveler's check-in history. This can also be exportable to a map to show the locations.

Global Administrator panel for setting telephone numbers to be contacted via SMS for Panic Alerts.

Global/Company Admin panel can have feature to be notified via SMS when specific traveler has checked in. This feature can be useful for travelers in high-threat areas, and/or for parents sending children overseas for study abroad programs.

Advanced "Journey Management" time 808/location notification features.

Emergency activation feature that can allow Global Administrator to ping the user 131's phone and activate the client side application 906 app in order to determine its location.

A geo-fencing application that can notify selected users when client side application 906 user 131 has left a predetermined area.

Feature that can display Maps feature on client side application 906 user 131's phone to allow Administrators to view movements in real time.

Company Admin panel can include spaces for listing Primary and Alternate 1 and Alternate 2 Points of Contact. Information preferably includes Name, Email Address, Work Phone, Cell Phone and Home Phone.

Travelers, Global/Company administrators can attach documents (passport copy, traveler facial image, etc.) to traveler's enrollment profile (.docx, .pdf, .jpeg, etc.).

Built-in contact numbers for direct global tracking server 100 (non-emergency) assistance.

Direct medical/security access to Medical services provider 24/7, multilingual control center. Auto call-up of client case handling instructions and Initiation of pre-arranged response protocol 400s (prioritized, notification list, etc.) Optional emergency evacuation for medical/security (including natural disaster) evacuation.

Worldwide overseas response (using global tracking server 100, Medical services provider and other trusted resources.)

All incidents and issues managed may be managed global tracking server 100 (may allocate resources as necessary).

Destination-based monitoring and response protocols for addressing risk at higher-risk locations. (Specific locations at which the user needs to check-in, etc.)

Check-in frequency based on a comparison of the device location with server-based check-in rules. The rules are based on pre-defined risk, threat and other criteria (locations such as Egypt, Iraq, Afghanistan, etc., and/or client requirements). A set of blanket rules for check-in frequency will apply when travelers are reported to be in pre-defined, rule-based locations. When a traveler checks in on arrival, the location coordinates are matched to the location. Applicable check-in requirements are applied to the traveler's device.

Journey Management—Front-loading of journey way points (notifications when these are reached & response protocols for exceptions).

Journey-specific deviation monitoring. Specific protocols to respond to unplanned journey changes.

Access to smart phone application authenticated by facial recognition and/or biometric data.

Individual and group (workgroup) tracking based on client needs. Workgroup operational location fencing. Notification in the event of off-limit areas. Pre-defined, authorized travel zones.

Enrollment and tracking of service providers (drivers, etc.) as an additional safety function.

Panic alert: Feature to enable either manual or shake phone & confirmation of panic message.

Bluetooth feature with interface with satellite device.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

Although the present embodiments have been described with reference to specific example embodiments, it will be evident that various modifications and changes may be made to these embodiments without departing from the broader spirit and scope of the various embodiments. For example, the various devices, algorithms, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A computer-based system for verifying user location comprising at least one processor and memory configured with program instructions to:
   store a plurality of user profiles associated with a plurality of users, each user profile including contact information for a mobile device;
   determine an applicable tracking policy for each of the plurality of users based upon at least one set of tracking rules, the applicable tracking policy including a reporting schedule;
   monitor receipt of location reports for the plurality of users from the plurality of mobile devices, the location reports indicating physical, geographic locations of the plurality of mobile devices; and
   periodically determine a status for each of the plurality of users based on the reporting frequency and timing of the receipt of location reports relative to the reporting schedule.

2. The system of claim 1, wherein the at least one set of tracking rules includes different reporting schedules for different countries, the processor and memory being further configured to determine the applicable tracking policy based on determining a country in which each of the plurality of users is located.

3. The system of claim 2, wherein the processor and memory are further configured to store a plurality of travel itineraries associated with the plurality of users, and to determine the country in which each of the plurality of users is located based on the plurality of travel itineraries.

4. The system of claim 2, wherein the processor and memory are further configured to determine the country in which each of the plurality of users is located based on the receipt of location reports.

5. The system of claim 2, wherein each user profile further includes a user organization, the processor and memory are further configured to store a plurality of sets of tracking rules associated with different user organizations and to also determine the applicable tracking policy based on the user organization.

6. The system of claim 1, wherein the periodic determination of the status for each of the plurality of users by the processor and memory includes determining whether a most recent location report is on time or late.

7. The system of claim 6, wherein the processor and memory are further configured to automatically contact the mobile device to prompt the submission of another location report when a most recent location report is determined to be late.

8. The system of claim 7, wherein determining whether the most recent report is late further includes determining whether the most recent report is late by a first time period or a second time period longer than the first time period, and the processor and memory are further configured to automatically notify a third party contact in addition to automatically contacting the mobile device.

9. The system of claim 8, wherein each user profile further includes a user organization, the processor and memory are further configured to select the third party contact associated with the user organization.

10. The system of claim 1, wherein the processor and memory are further configured to receive location-specific travel alerts and to automatically forward the location-specific travel alerts to the plurality of mobile devices based on user locations.

11. The system of claim 1, wherein the processor and memory are further configured to monitor receipt of user panic notifications from the plurality of mobile devices, and to automatically notify a third party contact upon receipt.

12. The system of claim 11, wherein each user profile further includes a user organization, the processor and memory are further configured to select the third party contact associated with the user organization.

13. The system of claim 11, wherein the third party contact is associated with a medical response organization.

14. The system of claim 11, wherein the notification sent to the third party contact includes a user location.

15. The system of claim 14, wherein the user location is determined from the user panic notification.

16. The system of claim 1, wherein the processor and memory are further configured to store a plurality of travel itineraries associated with the plurality of users, the periodic determination of the status for each of the plurality of users by the processor and memory includes determining whether the location reports are consistent with the travel itineraries.

17. The system of claim 1, wherein the processor and memory are further configured to generate a status interface displaying the determined statuses for the plurality of users.

18. The system of claim 17, wherein each user profile further includes a user organization, the processor and memory are further configured to generate a plurality of organization interfaces, each one of the plurality of organization interfaces showing only users associated with a particular user organization.

19. The system of claim 18, wherein the processor and memory are further configured to generate a customized set of travel rules for the particular user organization via the one of the plurality of organization interfaces associated with the particular user organization.

20. The system of claim 18, generate to accept user profile information for users associated with a particular user organization via its organization interface.

\* \* \* \* \*